UNITED STATES PATENT OFFICE.

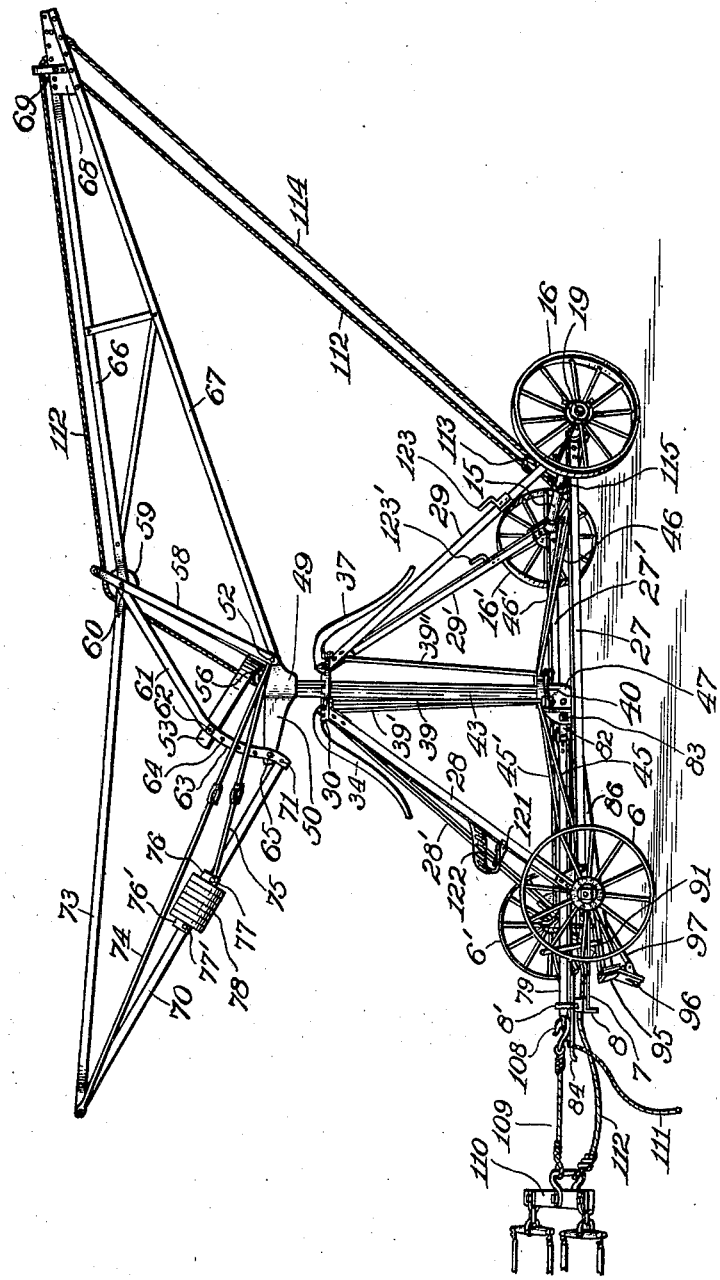

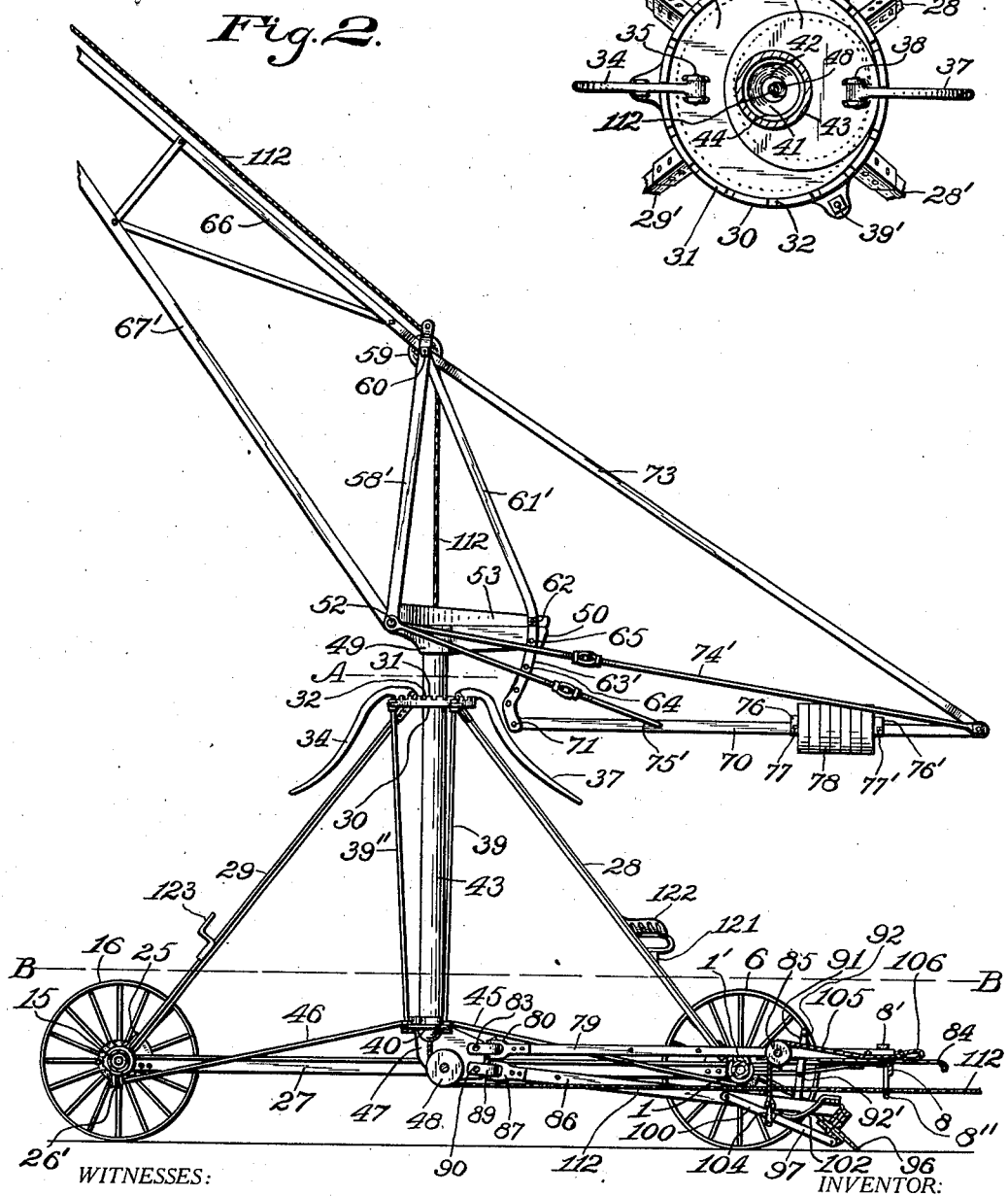

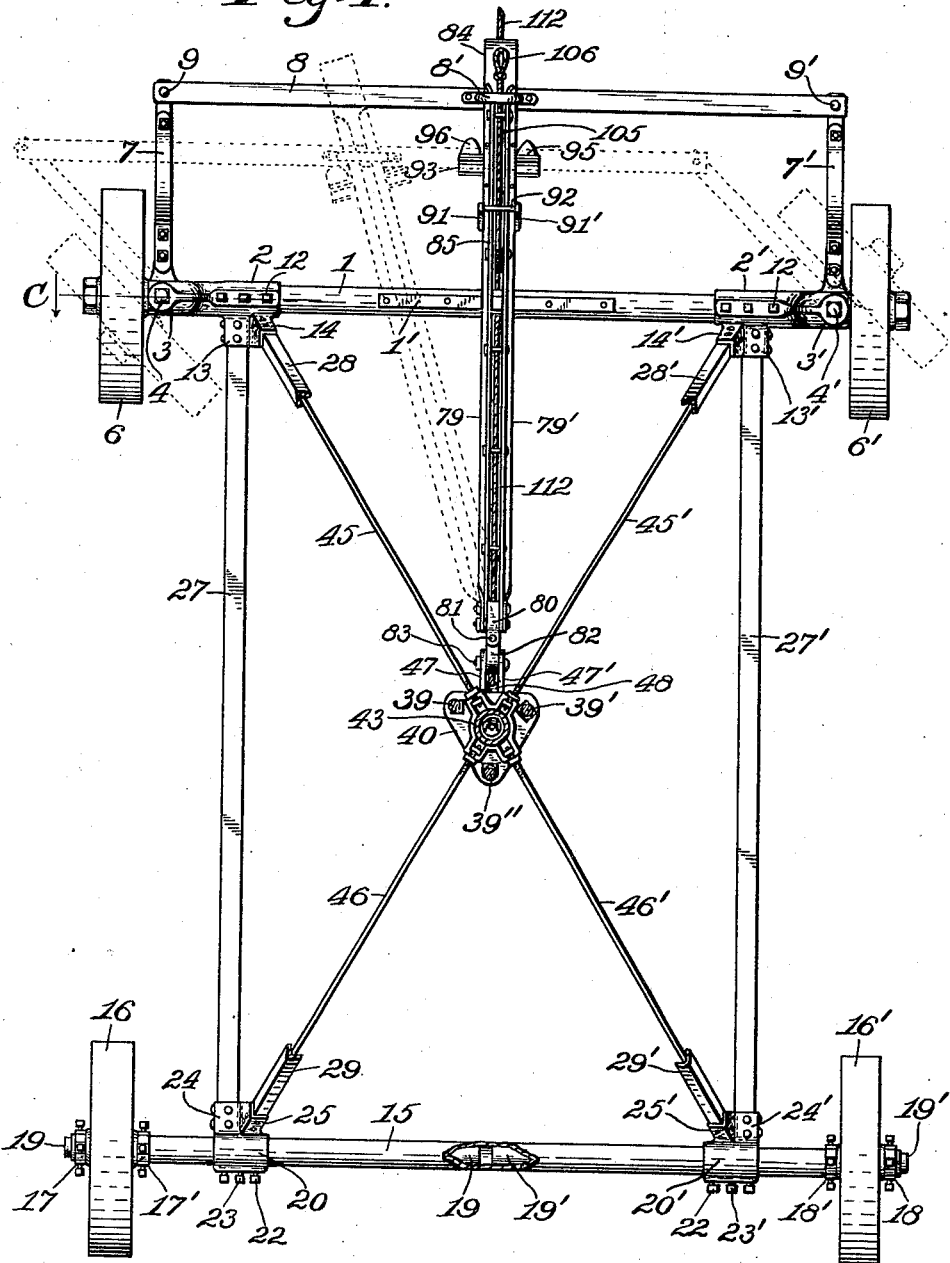

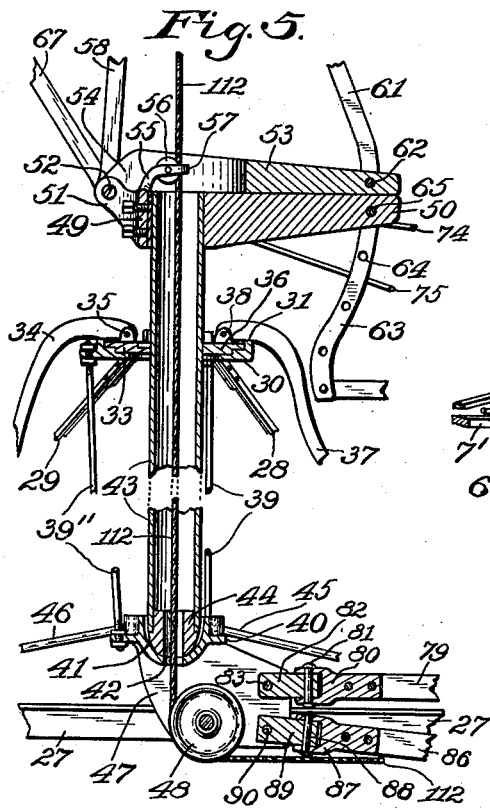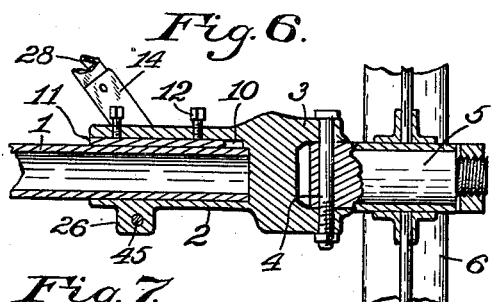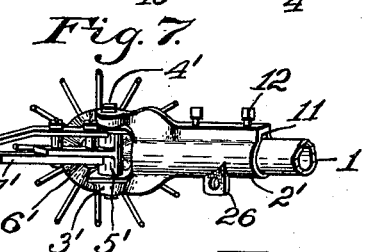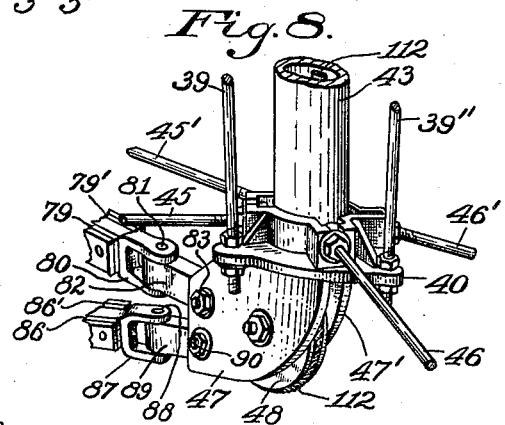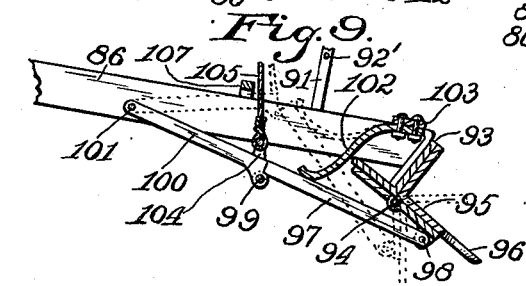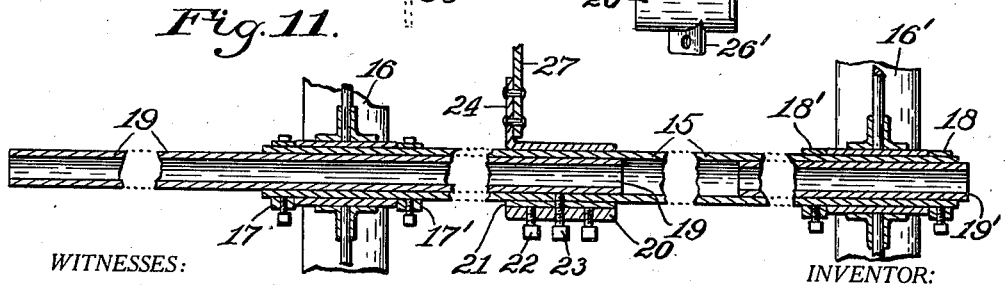

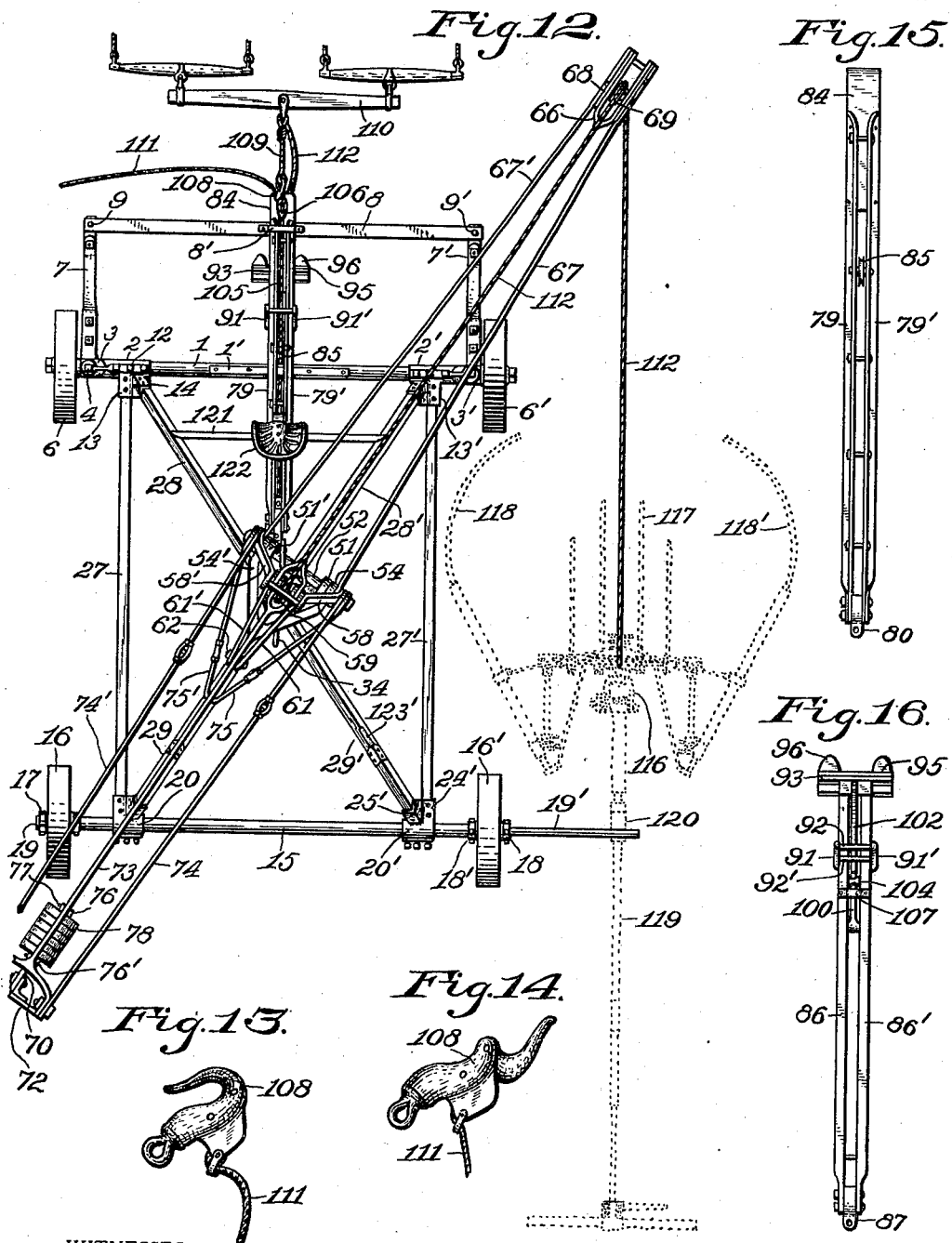

ARTEMUS N. HADLEY, OF INDIANAPOLIS, INDIANA.

PORTABLE DERRICK.

1,001,755.     Specification of Letters Patent.     Patented Aug. 29, 1911.

Application filed October 23, 1908. Serial No. 459,134.

*To all whom it may concern:*

Be it known that I, ARTEMUS N. HADLEY, a citizen of the United States, residing at Indianapolis, in the county of Marion and State of Indiana, have invented certain new and useful Improvements in Portable Derricks; and I do declare the following to be a full, clear, and exact description of the invention, reference being had to the accompanying drawings, and to the letters and figures of reference marked thereon, which form a part of this specification.

This invention relates to portable derricks of the class that are designed to be moved from place to place on highways or across fields, and to be used either for loading or for unloading, and especially for expeditiously loading corn-shocks onto wagons, the invention having reference particularly to various features of construction in a light-weight portable derrick.

The object of the invention is to provide a portable derrick for lifting purposes generally, and especially adapted to be easily moved in fields; another object being to provide a portable derrick that will be adapted to assist in operating shock-lifters, and to provide improvements to enable the derrick to be moved from the positions of the shocks to the positions of other shocks in succession and be quickly stopped and put into operation for lifting the shocks: a still further object being to provide improvements whereby the derrick will be enabled to take advantage of the force of gravity in swinging the loads lifted thereby.

Another object is to provide an improved derrick vehicle or carriage that will be of light weight and strong, not liable to upset or turn over and yet be adapted to be turned at sharp angles while in transit.

The invention consists in an improved portable derrick comprising a wheeled carriage, lifting apparatus mounted on the carriage and including a hoisting cable, an anchor mounted on the carriage and adapted to be dropped into engagement with the ground for stopping the carriage, means for holding the anchor from the ground while moving the carriage, a draft device connected to the hoisting cable and also connected with the means for holding up the anchor to normally draw the carriage, and means for instantly severing connection between the draft device and the anchor.

The invention consists also in novel features of construction in portable derricks, and in the parts and combinations and arrangements of parts, as hereinafter particularly described and then defined in the accompanying claims.

Referring to the drawings Figure 1 is a perspective view of the improved derrick as usually adjusted for traveling from place to place; Fig. 2, a side elevation in which the end of the arm of the derrick is broken away, and the lower portion is shown in longitudinal vertical section near the middle of the carriage; Fig. 3, a fragmentary horizontal sectional view on the line A in Fig. 2; Fig. 4, a horizontal sectional view on the line B B in Fig. 2; Fig. 5, a fragmentary vertical central sectional view longitudinally of the carriage; Fig. 6, a fragmentary vertical sectional view approximately on the plane of the line C in Fig. 4; Fig. 7, a fragmentary perspective view showing portions of the forward axle and one forward wheel; Fig. 8, a fragmentary perspective view showing various parts at the middle of the carriage; Fig. 9, a fragmentary longitudinal vertical sectional view of the anchor; Fig. 10, a perspective view of one of the parts of the derrick frame; Fig. 11, a fragmentary horizontal sectional view of the rear axle of the carriage; Fig. 12, a top plan of the derrick shown as when being used to assist in operating a shock-lifter; Fig. 13, a side view of a cast-off hook for releasing the anchor; Fig. 14, a side view of the cast-off hook opened; Fig. 15, a top plan of the draw-bar of the carriage; and Fig. 16, a top plan of the anchor.

Similar reference characters throughout the drawings indicate corresponding elements or features of construction referred to herein.

The improved portable derrick comprises a supporting and carrying frame formed as a carriage having four wheels for its transportation, and the axles of the carriage form parts of the frame. Preferably a hollow forward axle main part 1 is employed having preferably a bearing-plate 1' on the top thereof, the ends of the part 1 having end pieces 2 and 2' thereon, the end pieces having hinge-jaws 3 and 3' formed thereon in which are vertical hinge-pins 4 and 4' to which are connected axle ends 5 and 5', being thus adapted for the forward axle and the forward wheels 6 and 6' are mounted rotatively on the pivoted axle ends, the axle ends being provided with controlling arms 7 and 7' respectively to which a coupling-bar 8 is connected by pivots 9 and 9', the middle portion of the bar having a yoke 8' on the top thereof. Each end piece 2 and 2' has a recess 10 therein in which is a bearing-plate 11 that is engaged by screws 12 with which the end piece is provided, thus securing the end piece rigidly to the hollow main part of the axle. The end pieces have rearward extending projections 13 and 13' and also upwardly extending oblique-angle projections 14 and 14'. The rear axle 15 is hollow and has the rear wheels 16 and 16' mounted rotatively on its ends, one wheel being kept in position on the axle by suitable collars 17 and 17', and the other wheel is kept in proper position by suitable collars 18 and 18' on the axle. Two rods 19 and 19' which are preferably hollow are arranged in the axle 15 and form movable parts thereof and assist in stiffening the carriage frame of which the axle is a part, and either one of the rods may suitably be drawn partially out of the end of the axle for purposes to be hereinafter explained. Two collars 20 and 20' embrace the axle 15 and each collar has a bearing-plate 21 therein in contact with the axle and engaged by set screws 22, the collar 20 having also a set-screw 23 fitted therein that extends through the bearing-plate 21 and through the adjacent wall of the axle 15 and bears against the rod 19 for holding the rod in any desired position, and the collar 20' is provided with a similar set-screw 23' for the other rod 19'. The collars 20 and 20' have forward projections 24 and 24' and also angular projections 25 and 25' respectively. The under sides of the end pieces 2 and 2' are provided each with an apertured lug 26, and the under sides of the collars 20 and 20' are provided each with a similar apertured lug 26'. A pair of frame slide bars 27 and 27' are secured to the projections 13 and 13' and also to the projections 24 and 24'.

Two frame posts 28 and 28' are secured to and supported by the projections 14 and 14', two other frame posts 29 and 29' being secured to and supported by the projections 25 and 25', the posts leaning convergently so that their upper ends extend nearly to the middle or vertical axis of the frame, and a suitable collar 30 is secured rigidly to the tops of the posts. The collar has an upturned flange 30 in the top of which are notches 32. The collar supports and guides an eccentric block 33, the opening in which is relatively large and has an operating lever or handle-bar 34 connected to the top thereof by a pivot 35, the lever being adapted to enter either one of the notches 32 to prevent rotation of the eccentric block on the collar and is adapted also to turn the collar when unlatched. A relatively smaller eccentric block 36 is mounted rotatively in the opening of the eccentric block 33 and the opening therein is central with the collar 30 when both eccentric blocks are set in the positions illustrated in Fig. 3, the smaller eccentric block having a lever or handle-bar 37 connected thereto by a pivot 38 for its operation and adapted to enter either one of the notches 32 to latch the eccentric block 36. A plurality of rods as 39, 39', 39'', are hung to the collar 30 and have a center piece 40 connected to the lower ends thereof, the center piece having a concave socket 41 therein in the center of which is an aperture 42. A hollow mast column 43 is provided at its lower end with an annular convex bearing piece 44 that is seated in the socket, so as to form a ball and socket joint, and the column extends through the opening in the smaller eccentric block 36 so that if the eccentric blocks or either one of them be turned rotatively about the column the vertical angularity of the column may be changed with respect to the carriage frame or supporting base of the derrick. Two rods 45 and 45' are connected to the forward portion of the center-piece and are connected to the lugs of the end pieces 2 and 2' of the forward axle, two other rods 46 and 46' being connected to the rear part of the center-piece 40 and are connected also to the lugs of the collars 20 and 20' respectively, thus bracing the frame and maintaining the center piece 40 in its proper central position. The ends of the rods that are connected to the center-piece are slightly higher than the opposite ends of the rods so that the rods have a tendency to draw the center-piece 40 downward, so that as the strains are resisted by the frame posts the whole frame is stiffened and the center-piece 40 cannot jolt upward during movements of the carriage over rough ground. The center-piece 40 has two side-plates 47 and 47' between the lower portions of which a sheave 48 is mounted rotatively.

It will be understood from the foregoing that the column 43 is rotatively supported, and the mast may have any suitable lifting apparatus mounted on the top thereof, but as adapted for lifting loads to moderate heights the column extends but a short distance above the top of the eccentric block 36 and it has a head 49 mounted thereon and preferably secured thereto in any suitable manner, but it is obvious that if desired the column 43 may support the head 49 rotatively. The head 49 has a laterally extending arm 50 on one side thereof and also two hinging ears 51 and 51' on the opposite side thereof that have a hinge-rod 52 mounted therein.

The mast of the derrick comprises also a base member 53 that normally rests on the arm 50 and has two hinging arms 54 and 54' connected to the hinge-rod 52. A bracket 55 is suitably supported by the head 49 and has a guide-sheave 56 mounted therein, the bracket having a guide 57 extending opposite to the sheave, so as to guide a cable centrally in the mast. Two mast posts 58 and 58' are mounted on opposite end portions of the hinge-rod 52 and converge at their upper ends between which a sheave 59 is mounted on a shaft 60 that is connected to the upper ends of the posts. Two stay-bars 61 and 61' are connected to the shaft 60 and extend to the end of the base-member 53 farthest from the hinge-rod 52 and are secured by a bolt or rivet 62 to opposite sides of the base-member. The stay-bars have curved extensions 63 and 63' extending downward against and beyond the sides of the arm 50 and have apertures 64 therein to receive a pin or bolt 65 whereby the extensions are connected to the arm 50 so that the base member 53 is secured against movement on its hinge. After removing the pin or bolt 65, base member 53 may then be moved on its hinge and held at any desired position by inserting the pin or bolt into others of the apertures 64. A beam 66 forming part of an arm extends from the upper ends of the posts 58 and 58', being preferably connected thereto by the shaft 60, and the outer end thereof has a pair of braces 67 and 67' connected thereto by a housing 68 in which a sheave 69 is mounted, the braces being connected to the hinge-rod 52 for support. The arm has suitable reach laterally and as to height to suit requirements and is approximately balanced by means of a beam 70 that is connected by a bolt or rivet 71 to the lower ends of the extensions 63 and 63' and extends horizontally rearward or opposite to the direction of the arm of the derrick, the outer end of the beam having a cross-bar 72 mounted thereon to which a stay-rod 73 is connected, the stay-rod being connected also to the upper ends of the posts 58 and 58' preferably by means of the shaft 60. Preferably two stay-rods 74 and 74' are connected also to the cross-bar 72 and to the hinge-rod 52, and also two other stay-rods 75 and 75' connected to the beam 70 and to the hinge-rod 52. Two collars 76 and 76' are secured adjustably to the beam 70 by set-screws 77 and 77' respectively or by other suitable means, and a suitable number of weights 78 are arranged on the beam 70 between the collars, so that the weights may be adjusted as may be desired to the best advantage in operation.

A draw bar is connected to the center piece 40 and it preferably comprises two bars 79 and 79' suitably connected together with space between them and having a hinge-jaw 80 attached thereto that is connected by a vertical pivot 81 to a hinge-block 82 which is attached to the plates 47 and 47' of the center piece by a bolt 83. The draw-bar extends across and is supported at its forward end portion on the axle part 1, normally resting on the bearing plate 1', and the forward end of the draw-bar is provided on the under side thereof with a projecting guide plate 84, the end portion of the draw-bar extending through the yoke 8' and thereby assisting to support the coupling-bar 8; and it will be seen that when the draw-bar swings in a horizontal plane about its pivot 81 it will move the coupling-bar 8 and consequently move and control the arms 7 and 7' so that the carriage may be guided in its movements by means of the draw-bar. A guide-sheave 85 is mounted between the bars forming the draw-bar at a suitable distance from the forward or outer end thereof.

The anchor comprises a beam, which is preferably formed of two bars 86 and 86' spaced apart and suitably connected together, and provided with a hinge-jaw 87 that is connected by a vertical pivot 88 to a hinge-block 89 which is connected to the plates 47 and 47' below the hinge-block 82 by a suitable pivot 90 that is arranged horizontally, so that the beam may swing both horizontally and vertically. Two guide arms 91 and 91' are secured to the beam and extend upward at opposite sides of the draw-bar, the tops of the arms being connected by a cross-bar 92 extending above the draw-bar to limit the downward movement of the beam, the arms being connected also by a cross-bar 92' arranged below the draw-bar to limit the upward movement of the beam with respect to the draw-bar, the cross-bar 92' being adapted to engage the under side of the draw-bar to prevent the beam of the anchor from binding against the under side of the axle part 1. The anchor beam is provided with a suitable main head member 93 which is provided at the lower end thereof with hinges 94 to which a movable head member 95 is attached and thereby connected to the main head part 93. The hinge member 95 extends downward forwardly with respect to the anchor beam and has fingers 96 on the forward edges thereof adapted to be forced into the ground when the anchor is dropped. The member 95 is suitably constructed so that it cannot swing upward beyond its normal position, but may swing downward in order to withdraw the fingers readily from the ground, and it is held in proper position to be forced into the ground by means of a knuckle-bar comprising a rod 97 that is connected to the under side of the member 95 by a pivot 98 and connected by a hinge-pin 99 to a rod 100 that is connected by a pivot 101 to the anchor beam, the pivot 99 being below the plane of the rods 97 and 100, the adjacent ends of the rods abutting when the rods are in alinement so that the knuckle-bar may break upward, but not downward, the knuckle-bar being normally held so as to be straight by a spring 102 secured to a bearing-block 103 that is attached to the anchor beam and pressing on the top of the rod 97. A loop 104 is connected to the hinge-pin 99 and has a cable 105 connected thereto that extends over the sheave 85 and under the yoke 8' and has a loop 106 formed on the end thereof which rests on the guide-plate 84 when the anchor is down to the ground. A yoke 107 is mounted on the anchor-beam to be engaged by the rod 100 of the knuckle-bar so that when drawing the cable 105 forward the anchor may be lifted by means of the knuckle-bar; or other equivalent devices may be employed to obtain the same result. A suitable latch-equipped knuckle-jointed cast-off hook 108 is provided to be connected to the loop 106 and has a draft cable or chain 109 connected thereto that is suitably connected to a draft device 110, the latch of the cast-off hook being operated by a rope 111 to be manipulated by the operator of the machine or the driver of the draft team. Any suitable power, of course, may be connected with the draft device 110. A hoisting cable 112 is connected to the draft device 110 and extends through a guide 8'' that is carried by the coupling-bar 8 and thence rearward between the two bars of the anchor beam to and about the guide-sheave 48, thence extending up through the hollow mast column 43 between the sheave 56 and the guide 57 to and over the sheave 59 and thence over the sheave 69, and is adapted to lift either by direct connection with shock lifters or other articles, or the cable may be connected with a pulley-block 113 and have the end portion 114 thereof carried up and attached to the end of the arm near the sheave 69. The axle 15 has a loop 115 thereon to which the pulley-block or the end of the cable may be connected to prevent the arm from swinging when not in use and when being moved from place to place.

A shock lifter described in Letters Patent No. 886,123, granted to me April 28, 1908, is indicated by broken lines in Fig. 12 to illustrate one of the uses of the rods 19 and 19' and the functions thereof, the patented apparatus comprising a head 116 to which are connected prongs 117 that are adapted to be forced into a standing shock of corn, curved arms 118 and 118' being provided to embrace the sides of the shock and hold it upright while being lifted, and the shock lifter and its load is controlled by an operating handle 119 extending from the head 116, the handle having a suitable device 120 thereon such as a swinging arm or finger adapted to be engaged by the rod 19' when drawn out or by the other rod 19 if drawn out of the axle when the shock lifter is used at the opposite side of the derrick. The shock lifter having been fully described in the Letters Patent therefore needs no further description.

Usually a beam 121 is attached to the posts 28 and 28' and a driver's seat 122 is mounted on the beam. A pair of brackets 123 and 123' are attached to the rear sides of the posts 29 and 29' for carrying various implements that may be used with the derrick from place to place, as for instance the shock lifter may rest on the brackets with the operating handle thereof extending rearward and supported by the hoisting cable, or a hay rake and lifter of somewhat similar construction to that of the shock lifter may be carried in a similar manner.

It should be understood that the frame of the carriage may be provided with any suitable platform or platforms for the use of attendants, but are omitted in the drawings in order to avoid obscuring more important parts of the machine. It should be understood also that various modifications are contemplated within the scope of the claims as circumstances may indicate.

It will be apparent that in lieu of the well known cast-off hook, any equivalent device may be employed that may be adapted to connect the cable or chain 109 with the cable 105 for draft purposes and so that they may be instantly disconnected by means of a pull-cord while under pulling strains. It should be understood that the crook of the hook 108 is hinged and normally latched to the shank portion thereof, and may be released to swing open so as to be drawn by the cable 109 out of the loop 106, when the latch is retracted by the cord 111.

When moving the derrick the draft device will draw the cable 105 forward slightly and thereby raise the anchor and then draw the carriage forward until it arrives at the required place for lifting a shock, the suspended shock lifter then being prevented from swinging rearward and forced into engagement with the shock when the device 120 is engaged by the rod 19 or 19', and then the attendant will jerk the rope 111 and thereby disconnect the cast-off hook 108 from the loop 106 so that the pulling stress will be transferred from the cable 105 to the hoisting cable 112 and permitting the anchor to drop to the ground and instantly stop the carriage while the hoisting operations proceed without delay. While moving the derrick toward a shock the levers 34 and 37 may require to be operated so as to readjust the vertical angle of the mast column 43, it being desired that the mast lean slightly so that the arm of the derrick will be affected by the force of gravity to swing the load from the place at which it may be picked up to the place at which the load is to be deposited, or in some cases it may be desired that the arm shall swing in the opposite direction by the force of gravity, and in attaining this result the weights may be required to be increased or decreased or shifted on the beam 70, as will be understood. It will be understood that when the eccentric block 33 is rotated and the eccentric-block 36 does not turn in the eccentric-block 33 there would be no change of angularity of the mast, but this will determine the direction toward which the mast may lean when the eccentric-block 36 is turned in the larger eccentric-block 33. When moving the derrick from place to place it is preferred to lower the arm as in Fig. 1 in order to clear bridge roofs or other overhead work, and when the arm is so adjusted it is preferable to shift the weights 78 toward the inner end of the beam 70.

Having described the invention what I claim as new, is—

1. A derrick including a movable carriage, an arm mounted to swing on the carriage, a cable operating on the arm to carry an implement, and a device mounted on the carriage and projectable laterally to engage and force the implement along with the carriage.

2. A portable derrick including a carriage, an anchor guided on the carriage to move upward or downward, a stop to limit upward movement of the anchor, a cable connected with the anchor, and a guide for the cable enabling it to move the anchor up to the stop and to draw the carriage.

3. A portable derrick including a carriage comprising a hollow axle, a pair of wheels rotative on the axle, a rod in the hollow axle and movable partially therefrom longitudinally, and means for securing the rod to the axle.

4. A portable derrick including a mast, an arm on the mast, a cable operating on the arm to carry an implement, and a carriage supporting the mast and having a projectable device mounted thereon to engage and force the implement along with the carriage.

5. A portable derrick including a carriage, a swinging arm mounted on the carriage and carrying a sheave, an anchor movably connected to the carriage, a hoisting cable extending over the sheave, and means connecting the anchor detachably with the cable.

6. A portable derrick including a carriage, a cable guided on the carriage to operate therethrough, an anchor movably connected to the carriage and provided with means for connecting it with the cable for raising the anchor, and means for disconnecting the cable from the anchor to drop the anchor.

7. A derrick including a movable frame having an annular bearing thereon, a guide-sheave mounted under the bearing, a hollow mast mounted on the bearing and movable angularly, means mounted on the frame bracing the mast adjustably for controlling angular movement thereof, an arm mounted on the mast to tilt and also to swing laterally, a cable-guide above the top of the mast, a sheave on the arm, and a cable extending over the sheave on the arm and over the cable-guide and also through the mast and about the guide-sheave under the bearing.

8. A portable derrick including a frame having an annular socket, wheels carrying the frame, a guide sheave mounted under the socket, a hollow mast having an annular bearing on its lower end mounted in the socket and movable angularly, means mounted on the frame bracing the upper portion of the mast adjustably to control angular movement thereof, an arm on the mast, a sheave on the arm, and a cable extending over the sheave on the arm and through the mast and about the guide-sheave under the socket.

9. A portable derrick including a movable carriage provided with means for hoisting and swinging a load lifter, and projectable means mounted on the carriage for preventing swinging of the lifter rearward and simultaneously forcing the lifter into engagement with the load while the carriage moves.

10. A portable derrick including a movable carriage, means mounted on the carriage for hoisting and swinging a load lifter, projectable means mounted on the carriage for forcing the lifter into engagement with the load while the carriage moves, and means for stopping the carriage while the lifter and load are being hoisted.

11. A portable derrick including a carriage, a cable guided on the carriage to operate therethrough, an anchor movably guided on the carriage to drop and stop the carriage, and connections between the cable and the anchor for raising the anchor and drawing the carriage by means of the cable and the anchor and provided with means for releasing the cable under strain from the anchor.

12. A portable derrick including a carriage, a cable guided on the carriage to operate therethrough, means for connecting the cable detachably with the carriage to draw the carriage, an anchor mounted on and connected to the carriage to be cast off to stop the carriage, means for holding the anchor to the carriage, and means for releasing the anchor.

13. A portable machine including a carriage having an anchor mounted movably thereon, means for guiding the carriage, means connected with the guiding means for supporting and carrying the anchor laterally, means for holding the anchor up to the supporting and carrying means, and means for releasing the anchor to stop the carriage.

14. A portable derrick including a carriage, a cable guided on the carriage to operate therethrough, an anchor mounted on and connected to the carriage to be cast off to stop the carriage while moving, means for temporarily connecting the cable with the carriage to draw the carriage, means for holding the anchor to the carriage, and means for disconnecting the cable from the carriage and casting off the anchor.

15. A portable derrick including a carriage, a hoisting cable guided on the carriage to operate therethrough, a draw-bar connected to the carriage and having a sheave thereon, an anchor having a beam hinged to the carriage and a head member to enter the ground, a draft cable connected with the anchor and extending over the sheave, and means for detachably connecting the draft cable with the hoisting cable.

16. A derrick including a frame having a mast-bearing thereon, wheels movably supporting the frame, a mast standing substantially upright on the mast-bearing and movable thereon to different degrees of angularity with respect to the frame, a collar supported by the frame and extending about the mast for lateral support of the mast, means for changing the degree of angularity of the mast, and means for changing the direction of inclination of the mast.

17. A portable derrick including a carriage, a mast on the carriage and supporting an arm, a sheave carried by the arm, a hoisting cable extending over the sheave, a draft device connected to the cable, and an anchor movably connected with the carriage to drop and stop the carriage and provided with means connected with the draft device for holding the anchor up from operative position.

18. A derrick including a frame having a mast-bearing thereon, a mast standing substantially upright on the mast-bearing and supporting a counterweighted arm, the mast being movable on the mast-bearing to different degrees of angularity with respect to the frame, means for changing the degree of angularity of the mast to shift the center of gravity of the arm, and means for changing the direction of the center of gravity of the arm.

19. A portable machine including a carriage, an anchor having a beam hinged at one end thereof to the carriage and its opposite end having a main head member fixed thereon, a movable head member hinged to the main head-member and provided with a projecting finger, a knuckle-bar pivoted to the movable head member and also pivoted to the anchor-beam, and means connected with the knuckle-bar for holding the anchor removably to the carriage.

20. A portable machine including a carriage comprising a rear axle mounted on wheels, a forward main axle part, frame members connected to the rear axle and also to the main axle part, axle ends pivoted to the main axle part and having arms thereon, wheels on the axle ends, a coupling-bar pivoted to the arms and having a yoke on the middle portion thereof, a center piece connected with the frame members, and a draw-bar pivoted to the center piece and extending beyond the main axle part and also through the yoke to control the coupling-bar and supported on the main axle part.

21. A portable machine including a frame having a center-piece and mounted on four wheels, two of the wheels being movable axially to guide the carriage, a draw-bar pivoted to the center-piece at one end thereof and having its opposite end portion supported on the frame to swing horizontally and connected with the axially-movable wheels to guide the carriage, means for moving the carriage, an anchor having a beam pivoted to the center-piece to move horizontally and also vertically below the draw-bar, means for holding the anchor up from the ground, means for guiding the anchor, and means for releasing the anchor.

22. A derrick including a column, a head mounted on the column and having an arm and also two hinging ears, a hinge-rod mounted in the ears, a base having two arms connected to the hinge-rod and having also a rearward-extending part on the arm of the head, two posts mounted on the hinge-rod, an arm-beam connected to the upper ends of the posts, a pair of braces connected to the base and also to the end of the arm-beam, a stay-rod connected to the base and also to the upper ends of the posts and the arm-beam, and means for adjustably securing the rearward-extending part of the base to the arm of the head.

23. A portable derrick including a pair of axles, wheels on the axles, a pair of frame-bars secured at their ends to the end portions of the axles, four posts secured to the axles and the frame-bars, a collar attached to the tops of the posts, a plurality of rods depending from the collar, a center-piece attached to and supported by the rods, a plurality of rods connected to the center-piece and also with the axles and the frame-bars, a mast mounted on the center-piece and extending through the collar, and an arm mounted on the mast.

24. A derrick including a column, a head mounted on the column and having a lateral arm, a base hinged at one end thereof to one side of the head, two posts mounted on the base, an arm-beam connected to the upper ends of the posts, a pair of braces connected to the base and also to the end of the arm-beam, a pair of stay-rods connected to the upper ends of the posts and also to the opposite end of the base and having curved extensions connected adjustably to the arm of the head, a beam attached to the extensions, a stay-rod connected to the beam and also to the upper ends of the posts and the arm-beam, a collar secured adjustably to the beam, and weights on the beam against the collar.

25. A derrick including a frame comprising side-bars and posts connected to the side-bars, a collar attached to the tops of the posts, a plurality of rods attached to the collar, a center-piece supported by the rods and having a socket-bearing therein, a plurality of rods connected to the center-piece and extending downward and radially to the side-bars and connected therewith, a main eccentric-block mounted rotatively on the collar, a relatively smaller eccentric-block mounted rotatively on the main eccentric-block, a mast supported in the socket-bearing and extending through the smaller eccentric-block, means for moving the eccentric-blocks rotatively, and an arm mounted on the top of the mast.

26. A portable derrick including a forward axle comprising a hollow main part and two end parts secured to the main part, each end part having a horizontal projection and also an oblique-angled projection extending upwardly, the end part having also a hinge-jaw thereon, an axle end hinged to the hinge-jaw, wheels rotative on the axle ends, means for controlling the axle-ends, a rear axle, wheels rotative on the rear axle, a pair of frame bars connected with the rear axle and secured to the horizontal projections, a pair of posts secured to the oblique-angled projections, a pair of posts connected with the rear axle and supported thereby, a collar mounted on the posts, rods secured to the collar, a center-piece supported by the rods, rods connected to the center-piece and also with the rear axle, rods connected to the center-piece and also with the end parts of the forward axle, and a mast supported on the center-piece and extending through the collar.

27. A portable derrick including a forward axle comprising a main part and two end parts secured to the main part, each end part having a hinge-jaw thereon, an axle end hinged to the hinge-jaw, wheels rotative on the axle-ends, means for controlling the axle-ends, a hollow rear axle having two collars secured thereon, each collar having a horizontal projection and also an oblique-angled projection thereon extending upward, wheels rotative on the rear axle, a pair of frame bars connected with the end parts of the forward axle and to the horizontal projections of the collars, a pair of posts secured to the oblique-angled projections, a pair of posts connected with the end parts of the forward axle and supported thereby, a collar mounted on the posts, rods supported by the collar, a center-piece supported by the rods, rods connected to the center-piece and also with the end parts of the forward axle, rods connected to the center-piece and also to the collars that are on the rear axle, and a mast supported on the center-piece and extending through the collar that is mounted on the posts.

28. In a derrick, the combination of a frame comprising a collar, a support for the collar, and a center-piece having a socket therein in which is an aperture; a guide sheave mounted in the center-piece below the socket, a hollow mast supported in the socket and extending through the collar, an arm mounted on the mast, a sheave mounted on the arm, and a cable extending over the sheave that is on the arm and through the hollow mast and the aperture in the socket down to and under the sheave that is mounted below the socket.

29. In a derrick, the combination of an upright column, a head mounted on the column and having a hinge-member on one side and a lateral arm on the opposite side thereof, a base normally resting on the lateral arm and hinged to the hinge-member to be moved from the arm, a crane-arm supported on the base, means for securing the base to the lateral arm of the head, means for connecting the base with the lateral arm when the base is moved away from the arm, and a hoisting cable on the crane-arm.

30. In a derrick, the combination of an upright column, a head mounted on the column and having two hinging ears on one side and a lateral arm on the opposite side thereof, a base normally resting on the lateral arm and having two hinging ears thereon, a hinge-rod connecting the hinging arms to the hinging ears, two posts mounted on the hinge-rod, an arm-beam connected to the tops of the posts, two braces mounted on the hinge-rod and connected to the arm-beam, a sheave mounted on the posts, a sheave mounted on the arm-beam, a cable extending over the sheaves, means for connecting the base adjustably to the lateral arm of the head, a stay-bar connected to the posts and also to the base remote from the hinge-rod, a balancing beam having one end thereof connected with the base and having a weight mounted thereon, and a stay-rod connected to the opposite end of the balancing beam and also to the posts.

31. In a derrick, the combination of a rear hollow axle having two rods therein, two wheels rotative on the ends of the axle, two collars embracing the axle and having each an apertured bearing-piece at the inner side thereof engaging the axle, set-screws mounted in the collars and engaging the bearing-pieces, retractable set-screws mounted in the collars and extending through the apertured bearing-pieces and engaging the rods, the rods being movable longitudinally when the set-screws are retracted therefrom, frame members connected with the axle, a forward axle connected with the frame members, wheels rotative on the forward axle, and a mast mounted on the frame members.

32. In a derrick, the combination with a rear axle, wheels on the axle, frame members connected with the axle, and a mast mounted on the frame members, of a forward axle comprising a hollow main part, a pair of end-parts on the ends of the main part attached to the frame members and having each a recess therein, bearing-pieces in the recesses and engaging the main part, set-screws mounted in the end-parts and engaging the bearing-pieces, axle-ends hinged to the end-parts, arms on the axle-ends, a coupling-bar pivoted to the arms, and wheels on the axle ends.

33. In a derrick, the combination of a pair of axles, wheels on the axles, frame members supported by the axles and comprising two forward posts and two rear posts, each one of the rear posts having a bracket on the rear side thereof, a collar supported by the posts, a center-piece supported by the collar, lateral stay-rods connected to the center-piece, a mast mounted on the center-piece and extending through the collar, an arm mounted on the mast, and a hoisting cable mounted on the arm to extend into proximity to the brackets on the rear posts.

34. In a derrick, the combination of a pair of axles, wheels on the axles, a frame connected to the axles and comprising a center-piece arranged between the axles, stay-rods connected to the center-piece and also to other parts of the frame, a mast mounted on the center-piece to support a load, a horizontal bar having support on one of the axles, an anchor abutting and connected to the center-piece and provided with a hinge having a horizontal hinge-pin, the anchor being arranged below the horizontal bar and having a head provided with fingers, and a lifting device connected with the anchor and coöperating with the horizontal bar.

35. In a derrick, the combination of a rear axle, wheels on the axle, a forward axle main part, a frame mounted on the rear axle and the axle main part, axle ends hinged to the axle main part, wheels on the axle ends, a mast mounted on the frame and supporting a crane-arm, a vertical pivot mounted on the frame, a draw-bar connected to the vertical pivot and having support on the forward axle main part to move sidewise thereon, and connections between the draw-bar and the axle-ends to guide the wheels thereon.

36. In a derrick, the combination of a rear axle, wheels on the axle, a forward axle main part, a frame mounted on the rear axle and the axle main part, axle-ends hinged to the axle main part, wheels on the axle ends, a mast mounted on the frame and supporting a crane-arm, a vertical pivot mounted on the frame, a draw-bar connected to the vertical pivot at one end thereof and having its free end supported to move sidewise, means connected with the draw-bar and also with the axle-ends for guiding the wheels thereon, an anchor having a beam connected operatively with the frame to swing laterally and also vertically, the anchor having a head provided with fingers, means for enabling the draw-bar to carry the anchor, and means for throwing off the anchor from the draw-bar.

37. In a derrick, the combination with a frame, of a center-piece, posts mounted on the frame, a collar mounted on the posts, suspension rods connected to the collar and also to the center-piece, stay-rods connected to the center-piece and also to the frame, a mast supported on the center-piece and extending through the collar for lateral support, and a crane-arm mounted on the mast.

38. In a derrick, the combination with a frame, and means for movably supporting the frame, of a center-piece, posts mounted on the frame, a collar mounted on the posts, suspension rods connected to the collar and also to the center-piece, stay-rods connected to the center-piece and also to the frame, an eccentric-block mounted rotatively in the collar, a handle-bar pivoted to the eccentric-block, a second eccentric-block mounted on said first mentioned eccentric-block, a handle-bar pivoted to said second eccentric block, a mast supported on said center-piece and extending through said second eccentric-block, and a crane-arm on the mast.

39. In a derrick, the combination with a frame, and means for movably supporting the frame, of a mast mounted uprightly on the frame and movable angularly thereon, said mast being provided with a head having a substantially horizontal pivot thereon, a crane-arm mounted on the pivot and provided with an adjustable counterbalance, the crane-arm turning about the axis of the mast, means mounted on the frame for changing the angle of the mast relatively to the frame, and means for controlling the direction of angular movement of the mast.

40. In a derrick, the combination with a mast, and a crane-arm mounted on the mast, of a rectangular frame supporting the mast and provided with a pair of rear carrying wheels, a pair of axle ends pivoted to the frame and having each a steering arm, steering wheels mounted on the axle ends, a coupling-bar pivotally connected to the steering arms, and a draw-bar pivotally connected with the frame and also operatively connected with the coupling-bar for controlling the steering arms.

41. In a derrick, the combination of a frame, wheels supporting the frame, a mast mounted on the frame, a crane-arm mounted on the mast, an anchor pivotally connected at one end to the frame and provided on its opposite end with a relatively movable head to enter the ground, means for lifting the head from the ground, means for normally holding the head from the ground, and means for automatically moving the head relatively to the anchor on lifting the head from the ground.

42. In a portable derrick, the combination with a frame, and wheels movably supporting the frame, of a column supported uprightly on the frame, a head supported on the column and having a substantially horizontal pivot thereon, a crane-arm mounted on the pivot and extending outward beyond one side of the axis of the column, the crane-arm having a beam thereon extending outward beyond the opposite side of the axis of the column, guide sheaves mounted on the crane-arm, a cable extending over the sheaves, and a counterweight on the beam.

In testimony whereof, I affix my signature in presence of two witnesses.

ARTEMUS N. HADLEY.

Witnesses:
HARRY D. PIERSON,
E. T. SILVIUS.

Copies of this patent may be obtained for five cents each, by addressing the "Commissioner of Patents, Washington, D. C."